Nov. 20, 1956     C. STEWART     2,771,601
TRACKING AND SYNCHRONIZING MECHANISM
Filed Dec. 8, 1951     4 Sheets-Sheet 1

INVENTOR.
CLYDE STEWART
BY
ATTORNEY

Nov. 20, 1956

C. STEWART 2,771,601

TRACKING AND SYNCHRONIZING MECHANISM

Filed Dec. 8, 1951

PULSE COMPARISON

PRE-GATE PULSES

GATING TUBE

INVENTOR.
CLYDE STEWART
BY
ATTORNEY

INVENTOR.
CLYDE STEWART
BY
ATTORNEY

United States Patent Office 2,771,601
Patented Nov. 20, 1956

2,771,601

TRACKING AND SYNCHRONIZING MECHANISM

Clyde Stewart, Cedar Rapids, Iowa, assignor to Collins Radio Company, Cedar Rapids, Iowa, a corporation of Iowa Application December 8, 1951, Serial No. 260,747

6 Claims. (Cl. 343—11)

This invention relates in general to tracking mechanisms and in particular to means for tracking a target with a radar antenna.

In radar applications it is oftentimes desirable to track a target so that its relative velocity may be calculated. Such tracking may be done by an operator who manually adjusts the antenna position in azimuth and elevation so as to remain on the target. Various systems have also been developed for automatically tracking a target as, for example, by nutating the antenna. A relatively new method of obtaining the error signals has been developed which comprises using an antenna with four horns spaced symmetrically. The horns are consecutively turned on to receive input signals. The left and right horns will receive inputs of equal amplitude if the antenna is centered in azimuth on the target, whereas the up and down horns will receive equal inputs if the antenna is centered in elevation. The different horns of the antenna are switched by gaseous switch tubes. Applicant has produced an apparatus which receives the inputs from the different horns of the antenna to compare them to obtain elevation and azimuth error signals so that the position of the antenna may be corrected. Applicant's system works with a random pulse repitition rate such as described in the patent entitled, Timing Device, inventor, Noel W. Hancock, Patent Number 2,614,218, issued October 14, 1952.

It is an object of this invention to provide an automatic tracking mechanism which maintains a lobe switching antenna centered on a target whether the pulse repetition rate be constant or variable.

Another object of this invention is to provide an automatic tracking mechanism which produces an error signal in the presence of a random pulse repetition rate.

Further objects, features and advantages of this invention will become apparent from the following description and claims when read in view of the drawings, in which:

Figure 2:
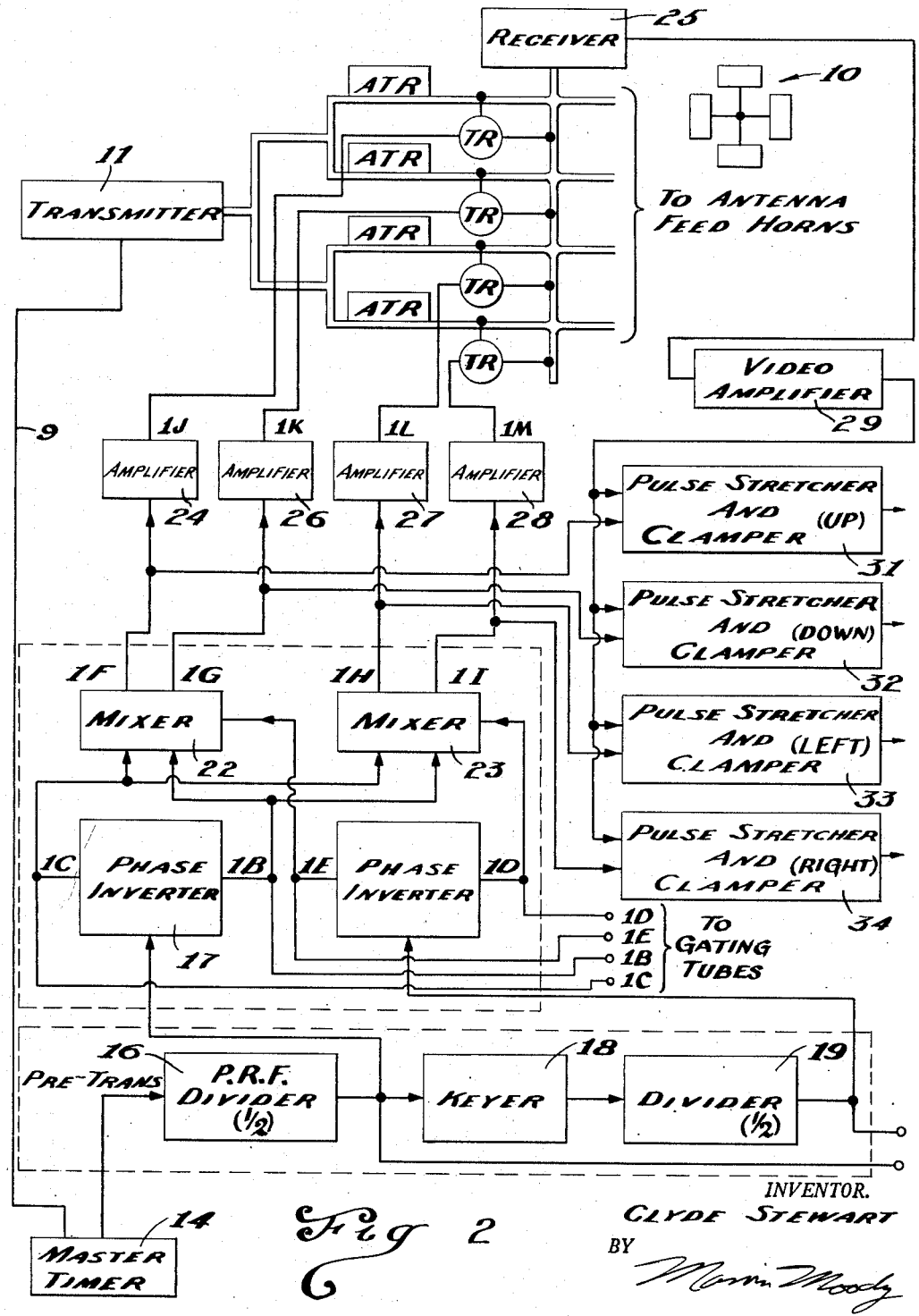
Figure 2 is a schematic diagram illustrating a portion of the automatic tracking mechanism of this invention.

Figure 2 illustrates a lobe switching antenna designated generally as 10 and which has four horns. A radar transmitter designated generally as 11 supplies an input to the antenna 10 which beams the emission toward a target. The signal is transmitted on all four horns of the antenna but listening is done successively by the various horns. The lobing sequence might be: the left horn, the right horn, the up horn, and finally the down horn. The outputs of the left and right horns, and the up and down horns, respectively, are compared and the difference in amplitudes of the incoming video is proportional to the azimuth and elevation errors respectively.

Figure 1:
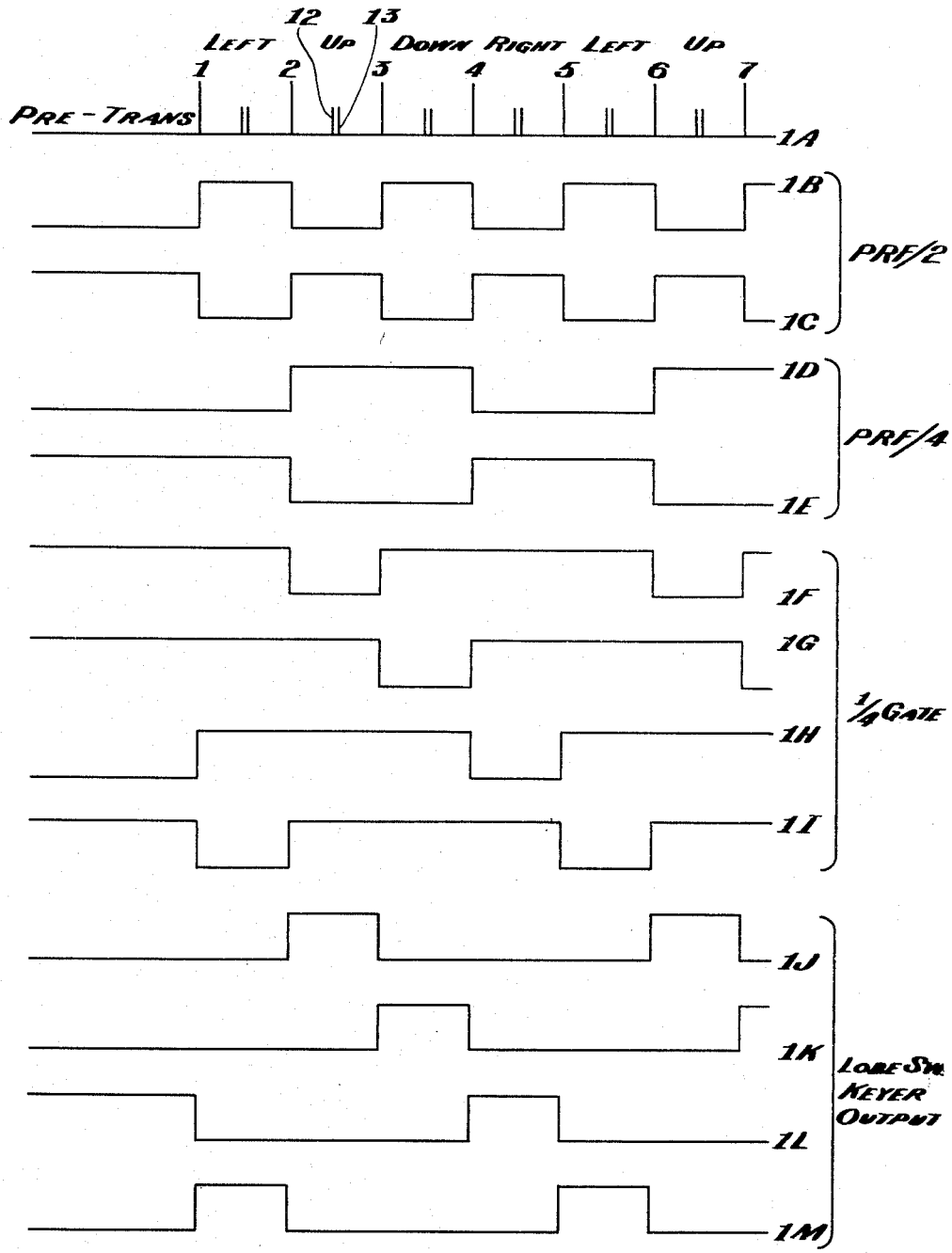
Figure 1 illustrates various pulse shapes which occur in the automatic tracking mechanism of this invention.

The manner in which the different horns of the antenna are switched may be understood by considering the wave shapes shown in Figure 1. The top figure, 1–A, illustrates a number of pre-transmit triggers numbered 1–7. These pre-transmit signals occur slightly before the transmitter 11 furnishes a signal to the antenna 10. The transmitted signal returns as an echo and is illustrated in figure 1–A as 13.

A second pulse 12 is generated upon the reception of an echo and is always spaced three microseconds ahead of the echo. This pulse is designated as the pre-gate trigger and is generated in the range unit. The returned echo used in automatic tracking is centered in the range gate by a servo system. The pre-gate trigger is generated by the leading edge of the range gate. For further details of the ranging unit reference may be made to the patent entitled "High Speed Slewing" Patent No. 2,611,893, filed March 30, 1951, inventor, David O. McCoy.

It is to be understood that the pre-transmitter pulses 1 through 7 may occur at any random repetition rate as, for example, variable between 1000 and 4000 cycles per second. The pre-transmit pulse is generated by the master timer 14 illustrated in Figure 2, and described in detail in the patent of Noel W. Hancock, entitled "Timing Device", which was issued on the 14th day of October, 1952, Patent Number 2,614,218. The timer 14 is also connected by lead 9 to the transmitter to trigger it as described in Patent 2,614,218. The pre-transmit trigger and transmit trigger have a predetermined time relationship.

The output of the timer 14 is furnished to a first pulse repetition frequency (PRF) divider 16 which changes it to a square wave of the form shown in figure 1–B.

A phase inverter 17 receives the output of divider 16 and produces an output in phase with signal 1 and a second output which is 180 degrees out of phase with 1–B.

A keyer 18 also receives a signal from divider 16 and keys a second divider 19 to form a wave shape designated as 1–D in Figure 1 which has a frequency of the master timer pulse repetition frequency divided by 4. The dividers 16 and 19 may be of any conventional type which divide the frequency of an input wave by two. There are many types of trigger circuits which may be used as dividers, for example.

A second phase inverter 21 receives the output of divider 19 and produces outputs 1–D and 1–E which are 180 degrees out of phase with each other.

A first mixer 22 receives the inputs 1B and 1C from the inverter 17 and an input 1E from the inverter 21. It mixes the 1B and 1C waves with the 1E wave and produces outputs of the form 1F and 1G, respectively, as shown in Figure 1.

In a similar manner a second mixer 23 receives the 1B and 1C waves and mixes each of them with the 1D wave. The outputs are shown as 1H and 1I in Figure 1.

Four amplifiers, 24, 26, 27 and 28 receive the waves 1F, 1G, 1H and 1I and invert their phases to produce the wave shapes 1J, 1K, 1L, and 1M, respectively. It should be noted that these four waves form pedestals between pairs of pretransmit triggers and occur every fourth pretransmit pulse in stairstep fashion. The four rectangular waves are connected respectively to gaseous switch tubes TR located on the wave guides as shown in Figure 2. During the positive going part of the wave a switch tube is "turned on" to allow that particular horn to listen. The other switch tubes are held in an off condition by the negative going portion of the wave. Thus the receiver is connected successively to the four horns one individual horn being connected for every fourth echo.

Since the echoes 13 received by each horn will be gated at different times and at different rates, because of the variable pulse repetition rate, it becomes necessary to remember the amplitude of the received echoes so that they may be compared with the signals of the other horns.

This is accomplished by pulse stretcher circuits which receive the inputs from the horns and preserve them until it is time to receive a new signal.

The video from the antenna 10 is sent to video amplifier 29 through a receiver 25 and to four pulse stretcher and clamper circuits, 31, 32, 33 and 34, respectively. The pulse stretcher 31 receives the wave form 1F from mixer 22. Pulse stretcher 32 receives the wave form 1G from mixer 22, and, likewise, pulse stretchers 33 and 34 receive the waves 1H and 1I, respectively, from the mixer 23. These pulses key the various pulse stretcher circuits so that they respond to the video furnished by the amplifier 29 at the desired time. Only one of the pulse stretchers is turned on for each time interval and each one corresponds to a particular lobe of the antenna.

The purpose of the pulse stretchers 31—34 is to remember the received signal long enough so that it may be compared with signals received by the other lobes of the antenna. This comparison is done by the apparatus shown in Figure 3 wherein a first pulse comparison circuit 36 receives inputs from the stretchers 31 and 32 and a second pulse comparison circuit 37 receives inputs from the stretchers 33 and 34.

Assuming that the stretchers 31 and 32 correspond to the up and down horns or lobes of the antenna 10, the output of the pulse comparison circuit 36 will be proportional to the error in elevation of the antenna. Similarly, if the stretchers 33 and 34 receive the inputs from the left and right horns from the antenna, the output of the pulse comparison circuit 37 will be proportional to the azimuth error.

Figure 4:
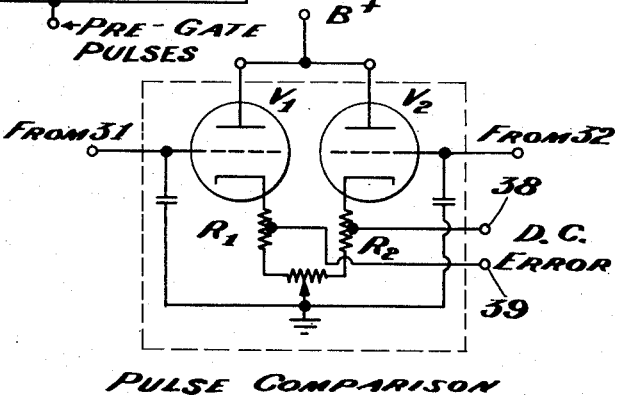
Figure 4 is a detail view of the pulse comparison circuit.

The pulse comparison circuit 36 is shown in detail in Figure 4 and comprise a pair of tubes $V_1$ and $V_2$ which have their plates connected respectively to B plus and their grids to the stretchers 31 and 32. The tubes have cathode resistors $R_1$ and $R_2$ and an output signal is taken from each of these resistors and supplied to terminals 38 and 39, respectively. The signal between these terminals is proportional to the elevation error and is connected to a servomotor which drives the antenna in elevation until the signal between the terminals is zero. The pulse comparison circuit 37 is similar to the circuit 36.

Figure 6:
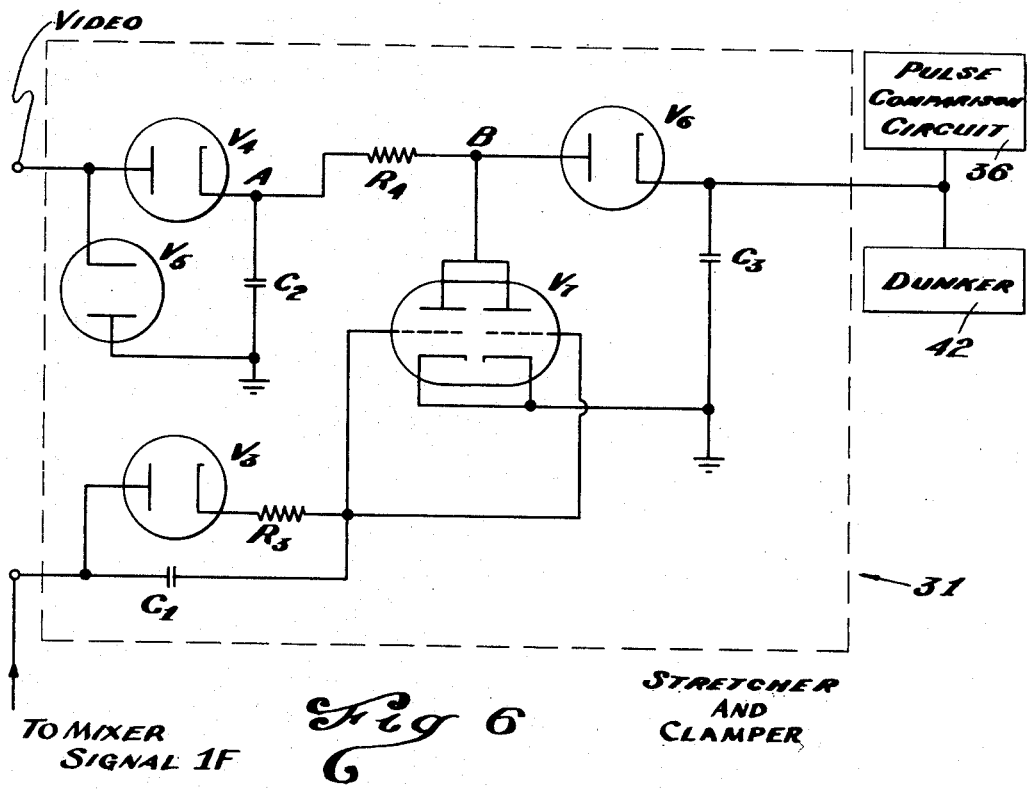
Figure 6 is a detail view of the stretcher circuit.

The pulse stretcher and clamper circuits 31—34 are illustrated in Figure 6. It should be remembered that the stretching circuits receive video pulses. Due to the clamping tube $V_7$ only one of four video pulses will be accepted by the circuit and the others will be shorted to the ground by tube $V_7$. The one pulse will be remembered as the charge on condenser $C_3$.

Synchronism between the associated horn and the stretcher circuit is provided by furnishing the waves 1F, 1G, 1H and 1I from the mixers 22 and 23, respectively. The signal 1F is connected to the plate of the diode $V_3$ in stretcher 31. A cathode resistor $R_3$ is connected to the cathode of $V_3$ and a condenser $C_1$ is connected between the plate and the resistor $R_3$. The incoming video signal is connected to the plate of a diode $V_4$ and the cathode of a diode $V_5$. The other signals 1G, 1H and 1I are similarly applied to the stretchers 32, 33 and 34 respectively.

The plate of diode $V_5$ is connected to ground and a condenser $C_2$ is connected between the cathode of tube $V_4$ and ground. A resistor $R_4$ is connected between the cathode of tube $V_4$ and the plate of a fourth diode $V_6$.

The incoming video signal is connected to the plate of tube $V_4$ and the cathode of $V_5$ and charges the condenser $C_2$. The condenser $C_2$ will share its charge with a condenser $C_3$ connected between the cathode of $V_6$ and ground.

A double triode tube $V_7$ has its plates connected to the plate of tube $V_6$ and its cathodes connected to ground. The control grids of $V_7$ are connected to the resistor $R_3$.

When the wave 1F applied to the plate of tube $V_3$ goes positive it biases the double triode $V_7$ so that it provides a low resistance path from the plate of $V_7$ to ground, thus allowing the condenser $C_2$ to discharge.

When the wave 1F goes negative the tube $V_7$ presents a high resistance between the plate of tube $V_6$ and ground, thus, allowing the condenser $C_2$ to charge and share its charge with condenser $C_3$.

It is to be understood of course, that the condenser $C_3$ is dunked immediately prior to the charging of condenser $C_2$. The condenser $C_3$ is the remembering condenser and it is the charge on this condenser which is received by the pulse comparison circuits. The term "dunking" when used herein means that a particular voltage stored at a certain point has been removed by completing a circuit, as for example, to ground so that the voltage disappears.

Figure 7:
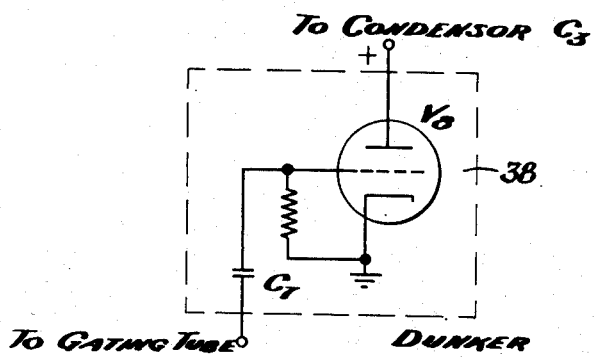
Figure 7 is a detail view of the dunker circuit.

The dunking circuit is shown in Figure 7. It comprises a triode $V_8$ with its plate connected to the condenser $C_3$ and its cathode connected to ground. A gating signal of positive pulses is applied to the grid through a condenser $C_7$ to place it in a conducting state so that the condenser $C_3$ may be discharged to the ground. Between pulses, condenser $C_7$ discharges to maintain tube $V_8$ in a cut-off state.

Figure 3:
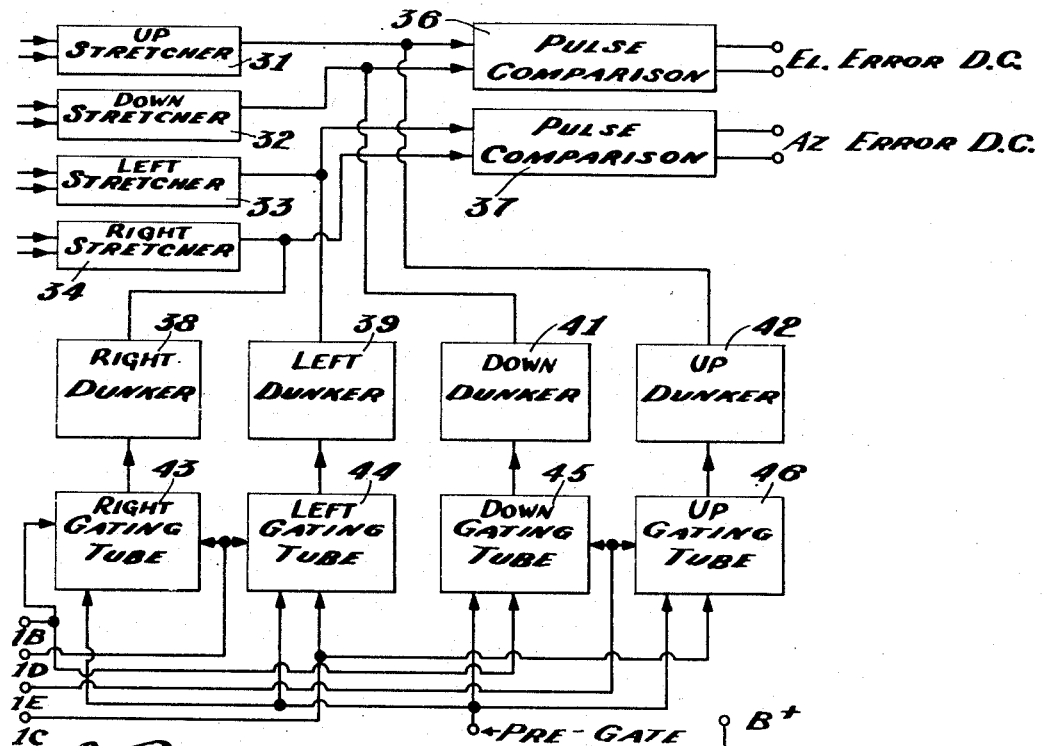
Figure 3 is a schematic view of the pulse comparison and dunker circuits.

As shown in Figure 3, there is a dunker tube for each stretcher circuit, being designated as 38, 39, 41 and 42, respectively. Gating circuits 43—46, respectively, are connected to dunkers 38, 39, 41 and 42 to put them in a conducting state at the desired time. Each of the gating tubes 43—46 receive the pregate trigger 12 from the range unit. They also each receive a pair of inputs of waves 1B through 1E. The gating tube 43 receives the waves 1B and 1D. The tube 44 receives the waves 1C and 1D. Tube 45 receives the waves 1B and 1E and tube 46 receives the waves 1C and 1E.

Figure 5:
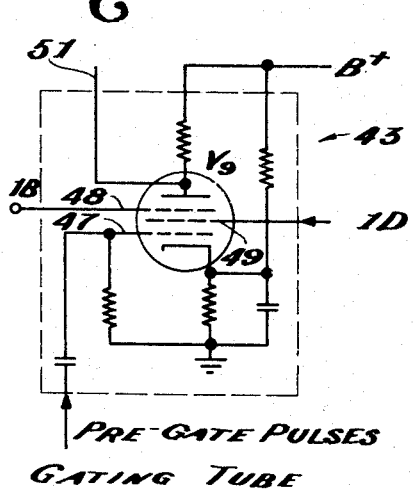
Figure 5 is a detail view of the gating circuit.

As shown in Figure 5 the gating tubes $V_9$ are pentodes and have the pregate triggers connected to first grids 47. A second grid 48 receives the wave 1B and a third grid 49 receives the wave 1D. Every fourth time interval, the 1B and 1D waves coincide so as to allow the pregate trigger to pass to the dunker tube $V_8$ which is connected to lead 51 of the gating tube.

Thus, the pulse stretchers are prepared each fourth interval for a new video signal which is furnished by the antenna lobe corresponding to the stretcher. The stretchers and lobe switch keyer tubes are operated in synchronism.

The master timer, described in the prior referenced patent application is an integral part of the invention and furnished the random repetition rate pulses for control purposes.

Although the apparatus has been described with respect to particular embodiments, it is not to be so limited as changes and modifications may be made therein which are within the full intended scope of the invention as defined by the appended claims.

I claim:
1. Means for producing elevation and azimuth tracking signals for a radar set comprising, a radar receiver, a master timer supplying pregate pulses immediately preceding received pulses, a four horn antenna receiving the received pulses, switching means connected between the receiver and said antenna, dividing means receiving an output from the master timer and supplying inputs to said switching means, four pulse stretching circuits having their inputs connected to the output of said receiver, said pulse stretching circuits receiving outputs from said dividing means so that each circuit receives every fourth received pulse, dunking means connected to said pulse stretching circuits and receiving inputs from said dividing means so as to respectively dunk the stretcher circuits just prior to the reception of its respective received pulse, a first pulse comparison circuit receiving inputs from a first pair of said stretching circuits to produce an output signal proportional to the azimuth error, and a second pulse comparison circuit receiving the outputs of the other two pulse stretching circuits to produce an elevation tracking signal.

2. Means for producing elevation and azimuth tracking signals for a radar set comprising, a radar transmitter, a radar receiver, a master timer supplying a control signal to said transmitter, a four horn antenna receiving the output of the transmitter, switching means connected between the receiver and said antenna, dividing means receiving an output from the master timer and supplying inputs to said switching means, four pulse stretching circuits receiving first inputs from said receiver and second inputs from said dividing means so that each circuit is disabled except for every fourth echo, four dunking circuits receiving inputs from said dividing means and connected to said pulse stretching circuits so as to dunk each stretching circuit just prior to the time when it receives an echo, said pulse stretching circuits each comprising a first diode receiving an input from the receiver on its plate, a first condenser connected between the cathode of said first diode and ground, a triode tube with its plate connected to the cathode of said first diode and its cathode connected to ground, a second diode with its plate connected to the dividing means and its cathode connected to the control grid of said triode, a second condenser connected to the plate of the second diode and to the control grid of the triode, a third diode with its plate connected to the plate of said triode, a third condenser connected between the cathode of the third diode and ground, and a pair of pulse comparison circuits receiving respectively, the outputs across said third condensers from a pair of pulse stretching circuits and producing elevation and azimuth signals, respectively.

3. Means for providing an error voltage for single dimension tracking of a pair of oppositely offset lobe antennas utilized with a pulse-receiving means, comprising means for sequentially connecting said lobe antennas to the input of said pulse-receiving means in synchronism with received pulses, means for generating pregating pulses preceding the received pulses by a time interval small compared to the minimum pulse-repetition rate of the received pulses, first and second pulse-stretching means for remembering the respective amplitudes of its received pulses, means for sequentially connecting said first and second pulse-stretching means to the output of said receiving means in synchronism with the sequential connection of said lobe antennas to said receiving means, wherein each pulse-stretching means receives pulses from only a single lobe antenna, first means for suddenly and momentarily discharging the output of said first pulse-stretching means in response to the pregating pulses immediately preceding the pulses received by said first pulse-stretching means, means for suddenly and momentarily discharging the output of said second pulse-stretching means in response to the pregating pulses immediately preceding the pulses received by said second pulse-stretching means, and means for comparing the magnitudes of the output voltages of said first and second pulse-stretching means to provide their difference voltage, which is said error voltage for obtaining tracking of said lobe antennas.

4. Means for providing an error voltage for single dimension tracking of a pair of oppositely offset lobe antennas utilized with a pulse-receiving means, comprising means for generating pregating pulses preceding the received pulses by a time interval small compared to the minimum pulse-repetition rate of the received pulses, first and second pulse-stretching means for remembering the respective amplitudes of their received pulses, means for sequentially connecting said lobe antennas to the input of said pulse-receiving means and for connecting said first and second pulse-stretching means in the same order to the output of said pulse-receiving means in synchronism with said received pulses, a pair of gating tubes each having one electrode connected to the output of said pregate pulse generating means and other electrodes connected to other outputs from said sequential connecting means, wherein said first gating tube provides a gate in response to pregate pulses immediately preceding the pulses received by one of said pulse-stretching means, and said second gating tube provides a gate in response to the pregate pulses immediately preceding the pulses received by the other of said pulse-stretching means, a first dunker circuit connected across the output of said first pulse-stretching means and normally having a very high impedance, said first dunker circuit having its input connected to the output of said first gating tube to provide a low impedance for the duration of each received gate, a second dunker circuit connected across the output of said second pulse-stretching means and normally having a very high impedance, said second dunker circuit having its input connected to the output of said second gating tube to provide a low impedance for the duration of each received gate, and a pulse-comparison circuit connected to the outputs of said first and second pulse-stretching means to provide said error voltage.

5. Means for providing error voltages for dual dimension tracking utilizing a plurality of offset lobe antennas and a pulse-receiving means, comprising means for sequentially connecting said lobe antennas in a given order to the input of said pulse-receiving means in synchronism with received pulses, means for generating pregating pulses that respectively precede the received pulses by a time interval small compared to the minimum pulse-repetition rate of the received pulses, a plurality of pulse-stretching means each for remembering the respective amplitudes of pulses received by it, means for sequentially connecting said pulse-stretching means in a given order to the output of said pulse-receiving means in synchronism with the sequential connection of said lobe antennas to the input of said receiving means, wherein each pulse stretching means receives pulses from only a single lobe antenna, a plurality of discharging means, each connected across the output of a different one of said pulse-stretching means for suddenly and momentarily discharging the output of its respective pulse-stretching means in response to each pregated pulse that immediately precedes a pulse received by its pulse-stretching means, first means for comparing the magnitudes of the output voltages of two of said pulse-stretching means that are connectible with a pair of said lobe antennas, and second means for comparing the magnitudes of the output voltages of another pair of said pulse-stretching means that are connectible with another pair of said lobe antennas that are differently positioned than said first-mentioned pair of lobe antennas, whereby the two comparison circuits provide output voltages which are error voltages for dual dimensional tracking.

6. Means for providing an error voltage for double dimension tracking utilizing up, down, left and right lobe antennas, and a pulse-receiving means, comprising means for generating pregating pulses that respectively precede received pulses by a time interval small compared to the minimum pulse-repetition rate of the received pulses; up, down, left and right pulse-stretching means, each remembering the respective amplitudes of given pulses received by it, means for sequentially connecting said lobe antennas to the input of said pulse-receiving means and for sequentially connecting said pulse-stretching means in a given order to the output of said pulse-receiving means all in synchronism with said received pulses; up, down, left and right gating tubes, each having one electrode connected to the output of the respective of said pregating pulse generating means and other electrodes actuated by said sequential connecting means, wherein each of said gating tubes provides a gate in response to the pregate pulse which immediately precedes a pulse received by its respective pulse-stretching means; up, down, left and right dunker circuits connected respectively across the outputs of said pulse-stretching means, each of said dunker circuits normally having a very high impedance, and each having its input connected to the output of a respective one of said gating tubes to provide a low impedance for the duration of each received gate, first comparison means for receiving and subtracting the magnitudes of the outputs of said up and down pulse-stretching means, and second comparison means for receiving and subtracting the magnitudes of the outputs of said left and right pulse stretching means, whereby the two outputs of said first and second comparison means are the error voltages for double dimension tracking of said antennas.

References Cited in the file of this patent

UNITED STATES PATENTS

| | | |
|---|---|---|
| 2,415,566 | Rhea | Feb. 11, 1947 |
| 2,422,068 | Bedford | June 10, 1947 |
| 2,422,333 | Bedford | June 17, 1947 |
| 2,426,216 | Hight | Aug. 26, 1947 |
| 2,433,341 | Busignies | Dec. 30, 1947 |
| 2,466,705 | Hoeppner | Apr. 12, 1949 |
| 2,597,862 | Grieg | May 27, 1952 |
| 2,671,896 | De Rosa | Mar. 9, 1954 |